Figure 1:
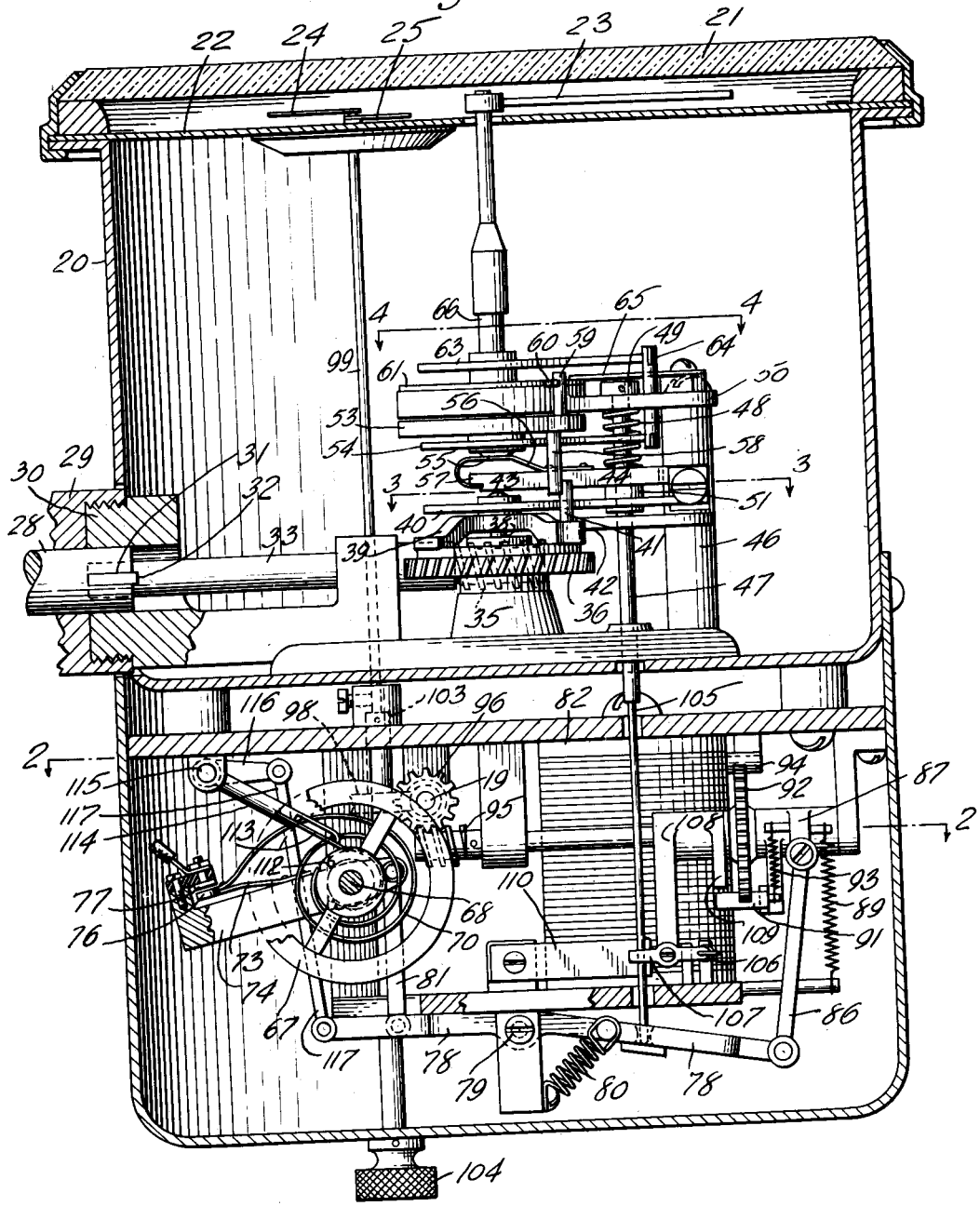

Aug. 12, 1930.  A. F. POOLE  1,772,556
ELECTRIC CLOCK AND THE LIKE
Filed Feb. 26, 1927  4 Sheets-Sheet 1

INVENTOR.
Arthur F. Poole
by Max D. Farmer
ATTORNEYS.

Aug. 12, 1930. A. F. POOLE 1,772,556
ELECTRIC CLOCK AND THE LIKE
Filed Feb. 26, 1927 4 Sheets-Sheet 2
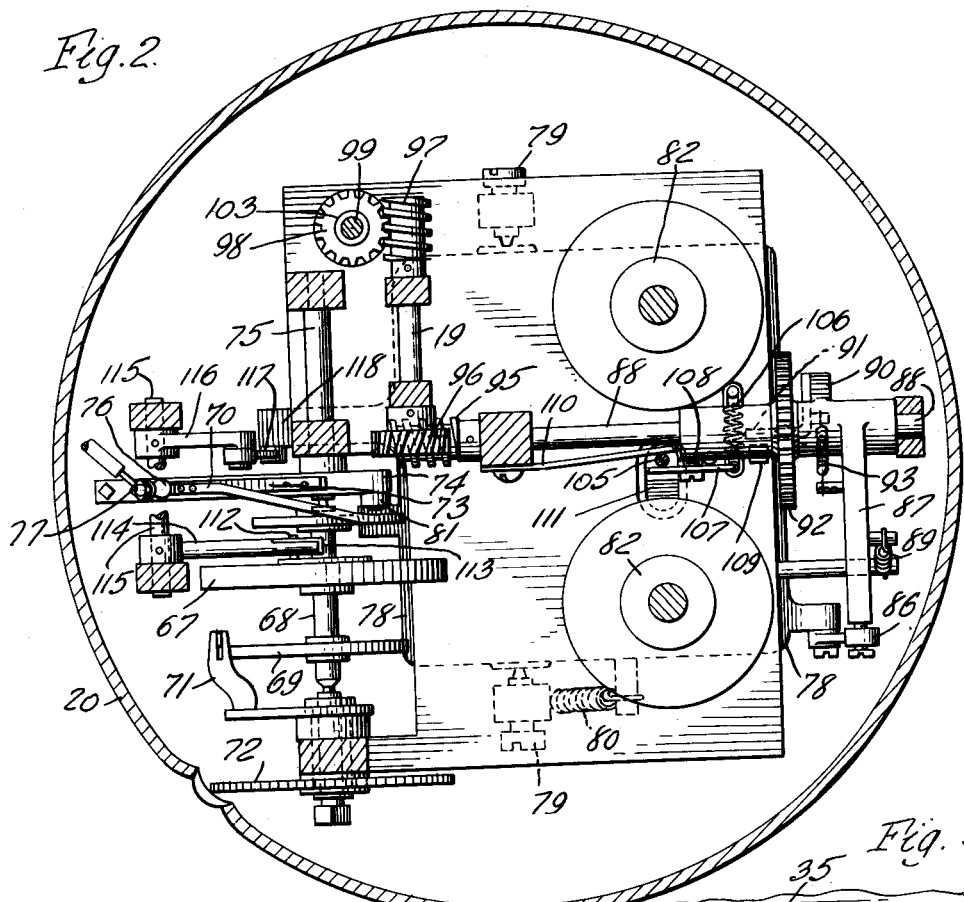
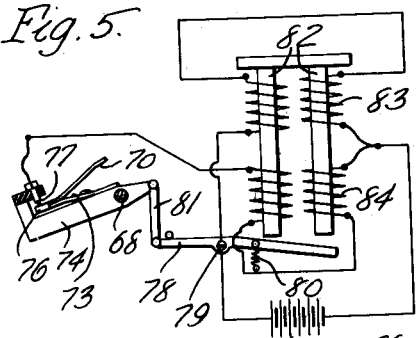
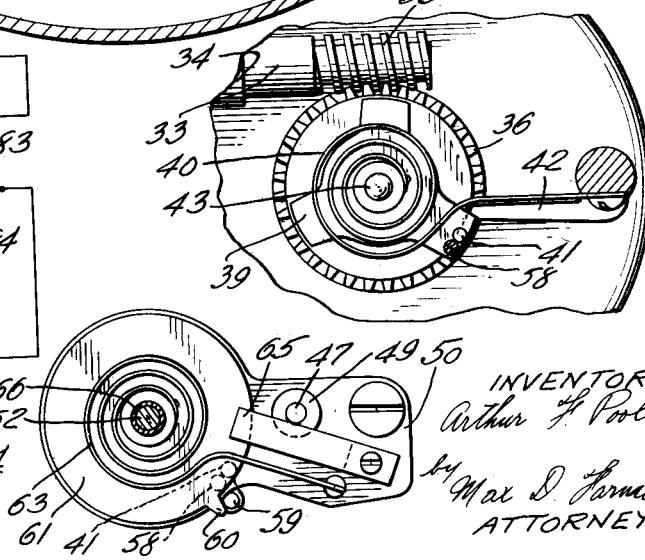

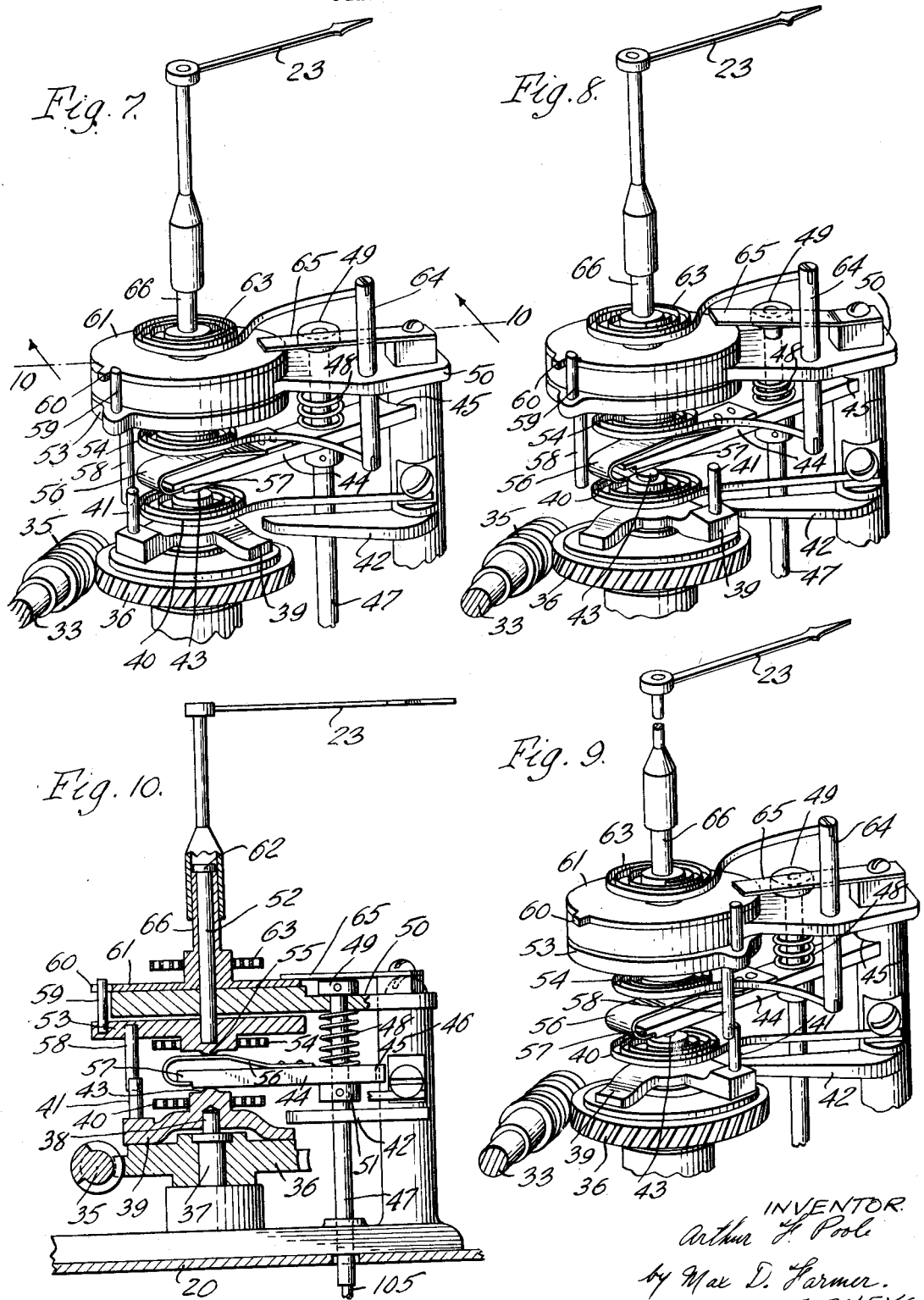

Patented Aug. 12, 1930

1,772,556

UNITED STATES PATENT OFFICE

ARTHUR F. POOLE, OF ITHACA, NEW YORK, ASSIGNOR TO POOLE MANUFACTURING COMPANY, INC., A CORPORATION OF NEW YORK

ELECTRIC CLOCK AND THE LIKE

Application filed February 26, 1927. Serial No. 171,162.

My invention relates to clocks and speedometers, and is designed especially for use on automobiles where trouble has been experienced with clock mechanisms, due to the fact that the jar of the automobile interfered with the running of the clock. While in the preferred embodiment of my invention hereinafter described I have shown it applied to an automobile, I do not wish to limit myself to this use, since my invention will be of value when used in connection with other devices. The subject matter of this application was divided out from my prior application upon which United States Patent No. 1,531,026 was granted on March 24, 1925. However, this application was filed after said patent was issued and is therefore not a divisional application.

One of the objects of my invention is to provide an improved clock movement which will not be subject to the interruption by stopping and further, by taking advantage of features peculiar to my hereinafter described clock, to combine with this clock means for the indication of speed. By the use of this combination, I am enabled to provide for an automobile a combined clock and speedometer head which will be reliable and accurate.

A further object of my invention is the provision of a novel means of actuating the clock movement. I may use a vibrating member, such as a balance wheel vibrating under the influence of a spring, and I maintain this balance in vibration by novel electrical means. The balance is kept in vibration by the expedient of displacing the free end of the hair spring through a small distance at each vibration of the balance. This action slightly winds this hair spring at each vibration of the balance and thus restores to the balance energy lost by friction.

In the preferred embodiment of my invention the power necessary to rewind the hair spring at each vibration of the balance wheel is furnished by an electric battery. In the embodiment of my invention hereinafter described, this battery may be the customary battery on automobiles used for starting, lighting, and other purposes.

A further object of my invention is to supply the power necessary to actuate the clock hands, so that this power will be entirely independent of the power necessary to keep the balance wheel in vibration. Consequently, any reasonable load may be put on the hands without interfering with the time-keeping qualities of the clock. In this connection, my improved clock mechanism will be found of great value in cases where it is desired to run a paper record for the purpose of keeping record of the speed of the car or for other purposes.

A further object of my invention is to take advantage of the above described property of my improved clock mechanism and utilize the clock mechanism for one of the elements of my improved speedometer.

A further object of my invention is to provide an improved electrical circuit for actuating the clock mechanism to the end of entirely suppressing all sparking at the contact points.

Further objects of my invention will hereinafter be described and will appear to those skilled in the art from the following specifications and claims.

Figure 6:
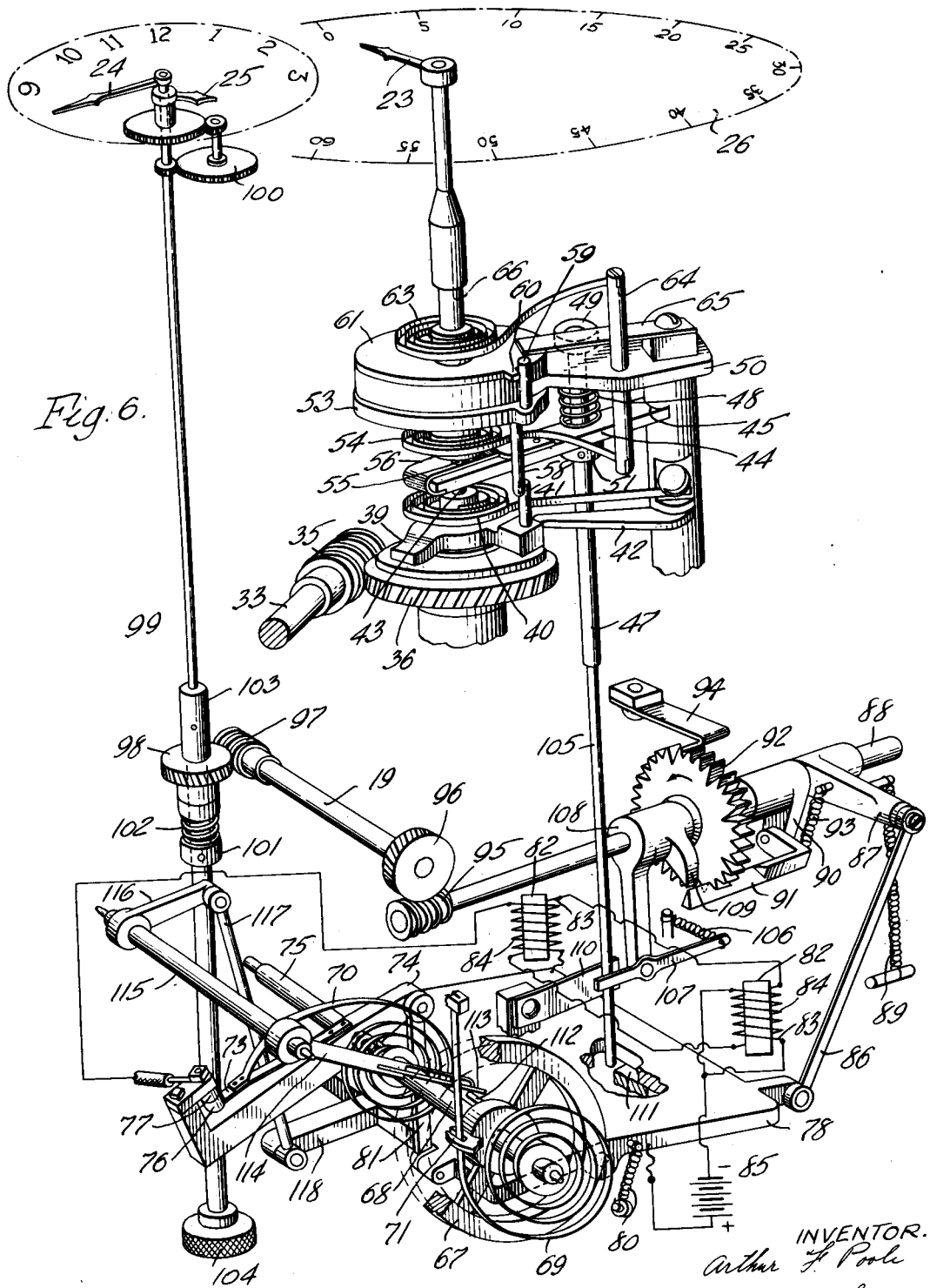

My invention can be best understood by reference to the accompanying drawings, of which Figure 1 is a vertical cross section of the apparatus; Figure 2 is a section along the line of 2—2 of Figure 1; Figure 3 is a longitudinal section along the line of 3—3 of Figure 1; Figure 4 is a section along the line of 4—4 of Figure 1; Figure 5 is a circuit diagram; Figure 6 is a perspective of the complete device; Figures 7, 8, and 9 are views of the speed indicating mechanism, showing successive positions assumed by this mechanism during operation of the device; Figure 10 is a vertical cross section of the mechanism shown in Figures 7, 8, and 9, looking along line 10—10 of Figure 7. The same reference numerals apply to the same parts in all of the figures.

Referring now to the figures, I have mounted my apparatus in a drawn casing 20 which is provided with a glass cover 21 serving to shield a dial 22, over which moves the speed indicating hand 23 and a pair of clock hands 24 and 25. The dial 22 is provided with a series of speed graduations 26, and a clock dial 27. The casing 20 is mounted on the dash board of the automobile and the motion of the front wheels of the automobile, or of the transmission thereof, is transmitted through a flexible shaft (not shown) to a terminal 28, which rotates in a nut 29, which screws on to a stud 30 mounted in the casing. The terminal 28 is provided with a keyway in which fits a key 32 on the end of shaft 33, which is revolubly mounted in a bearing 34 mounted in the casing 20.

Referring now to Figure 6, which will be seen with a worm wheel 35 mounted on the end of the shaft 33 and is in mesh with a mating wheel 36, which is rotatably mounted on a stud 37 rigid in the framework of the machine, (Fig. 10).

The function of the train of mechanism first described is to rotate the wheel 36 at a rate which is proportional to the speed of the automobile. Consequently, if the speed of rotation of the wheel 36 is measured, the speed of the automobile may be determined. The stud 37 is provided with a small stud 38. A spider 39, held in a normal position by a spring 40 and having a pin 41 mounted therein and adapted to contact with a stop 42 rigid to the frame is rotatably mounted on the stud 38. The spider 39 is provided with a boss 43, contacting with which is an arm 44 resting in a notch 45 in the pillar 46 rigid with the frame work. The arm 44 is held in its position by means of a rod 47 which is mounted in the frame work so that it can reciprocate and is held by compression of a spring 48 in a position determined by the contact of a collar 49, rigidly mounted to the rod 47, with the plate 50 which is rigid with the frame work. The second collar 51 is rigidly mounted on the rod 47 and serves to raise the arm 44 when the rod 47 is lifted, as will hereinafter be described.

From what has just now been described, it will be apparent that as long as the arm 44 is in the position shown in Figure 10, the spider 39 will be pressed into contact with the wheel 36 and will revolve with it against the tension of the returning spring 40. Therefore, if the rod 47 should be lifted (Fig. 10) the arm 44 will be withdrawn from contact with the boss 43. Consequently, the friction between the spider 39 and the wheel 36 will be removed and the spring 40 will return the spider 39 to its normal positon, determined by the contact of the pin 41 with the stop 42. As before noted, the rod 47 is raised periodically by means afterwards to be described, this rod being held in the position shown in Figure 10 for a certain period and then quickly elevated to the position shown in Figure 8 in which the arm 44 is shown out of contact with the boss 43. As soon as this elevation occurs, the spider 39 will at once be returned to its normal position by the spring 40.

As so far described, the action of the mechanism is that during a period when the rod 47 is in the position shown in Figure 10, the spider 39 is in contact with the wheel 36 and is carried around with it. When the rod 47 is thrown to its alternate position, the spider 39 returns to its normal position. Consequently, during each cycle of operation, the spider 39 is carried through a distance which depends upon the speed of rotation of the wheel 36, which in turn depends on the speed of the automobile. Therefore the angular displacement of the spider 39 from its normal position will be a measure of the rate at which the automobile is traveling.

I will now describe the means by which this displacement of the spider 39 is communicated to the speed indicating hand 23.

A stud 52 is rigidly mounted in the plate 50, extending through this plate. Rotatably mounted on the lower end of stud 52 (Figure 10) is a disk 53 having a returning spring 54 mounted on it and a central boss 55 which contacts with a spring 56 mounted on the arm 44 and held in a normal position by contact with a finger 57. When the arm 44 is in the position shown in Figure 10, the spring 54 will return the disk 53 until a pin 58, mounted rigidly therein, contacts with the pin 41 on the spider 39, since the function of the spring 56 is to press the disk 53 against the plate 50 and hold it in this position by friction. The disk 53 has also mounted on it a second pin 59, which is adapted to contact with an ear 60 on a disk 61, which is rotatably mounted on the upper end of the stud 52, being held thereon by a head 62 on said stud. The disk 61 is also provided with a returning spring 63 extending between said disk and a stud 64, mounted in the plate 50, and which also serves as a point of attachment for the spring 54. The pillar 46 has mounted thereon a spring which, when in its normal position, serves to press the disk 61 against the plate 50 and thereby maintain it against the tension of the spring 63. The upper part of the disk 61 is mounted on a sleeve 66 on which is mounted the speed indicating hand 23. The spring 65 is normally out of contact with the collar 49, but when the rod 47 is raised to its alternate position, the spring 65 is lifted from the disk 61, leaving the latter free to return under the influence of the spring 63. The complete cycle of action of parts from 37 to 65, inclusive, will be hereinafter described, subsequent to the description of the clock mechanism.

The clock mechanism can be best understood by reference to the perspective view in Figure 6. Referring to said figure, it will be apparent that there is a balance wheel 67 mounted on a shaft 68 which vibrates in the framework under the influence of the hair springs 69 and 70. The hair spring 69 has one end attached to the framework and is provided with the customary fork 71, which is adapted to be rotated in the framework by means of a regulating wheel 72, rigidly mounted in the framework and thereby changes the effective length of the spring 69. By this means the period of vibration of the balance wheel 67 may be accurately regulated.

The free end of the hair spring 70 is attached to the spring 73, fastened to the arm 74, mounted on shaft 75, which rotates in the framework and is in the same straight line as the balance wheel shaft 68. The spring 73 carries a contact point 76, which is adapted to contact with a second contact point 77, mounted on the arm 74 but electrically insulated from it.

It is evident that the vibrating system, consisting of the balance wheel 67 under the influence of the two springs 69 and 70, may be kept in vibration by the expedient of slightly rocking the arm 74 about its shaft 75 in a period equal to the natural period of the vibration of the balance wheel. The effect of this rocking is to wind and unwind the spring 70 at each vibration of the balance wheel and thereby keeping the balance wheel in vibration.

I will now describe the means by which the rocking of the arm 74 is accomplished.

I have provided an armature 78 which is pivoted in the framework at 79 and which is provided with a retractile spring 80, normally serving to hold the armature 78 in the position shown in Figure 1. The armature 78 is connected to the arm 74 by a link 81 and by reason of this connection the arm 74 is rocked on its shaft 75 at each vibration of the armature 78. For the purpose of vibrating the armature 78 at the proper times, I have provided an electromagnet 82 having two legs, both of which are number 82 in the drawings. The electrical circuits of this electromagnet are peculiar and are best shown in Figure 5, from which it will be apparent that the magnet is differentially wound, having two windings 83 and 84 which oppose each other. The windings of the magnet are connected in parallel to a storage battery which may conveniently be the storage battery used for starting the automobile, furnishing electric current for ignition and the lighting system on the car. When the contacts 76 and 77 are together, the current flows through both windings of the magnet and, since these windings oppose each other, the magnet is not energized. However, if the contact points are separated, then one of the differential windings, 84 is inactive and the magnet is energized by the active winding 83. From the above it follows that when the contact points 76 and 77 are together, the armature 78 is in the position shown in Figure 5, and that as soon as these points are opened, the armature 78 is attracted to the electromagnet, thus moving the arm 74 to its alternative position.

I will now describe how the above mechanism keeps the balance wheel 67 in vibration. Assume the parts in their normal position as shown in Figure 1. The battery 85 is connected to the electric circuit. Immediately, the armature 78 is attracted and the arm 74 is rotated in a clockwise direction (Figure 6), thus giving the initial tension to the hair spring 70, and it will be observed that this rotation of the arm 74 will maintain the contact points 76 and 77 in their open position. The balance wheel now starts to turn, but when the neutral point of the spring 70 has been reached, the momentum of the balance wheel will carry it a little farther and the tension of the spring 70 will cause the contact points 76 and 77 to close. This will at once deenergize the magnet 82, the armature 78 will be drawn away by the retractile spring 80 and the arm 74 will be rotated in clockwise direction. It will be observed that this rotation of the arm 74 will maintain the contact points 76 and 77 in their closed position, thus maintaining the deenergizing of the electromagnet 82. Upon the return vibration of the balance wheel 67, the spring 70 will be unwound, and the contact points 76 and 77 will again be opened. Immediately, the armature 78 will be attracted, thereby rotating arm 74 in clockwise direction and imparting additional impulse to the balance wheel. By reason of the above, the balance wheel will continue vibrating as long as current is furnished to the electromagnet 82.

Due to the fact that when the current is opened, there are no lines of force in the electromagnet 82, the breaking of the current 84 is accomplished without any induction spark, since it is the making of a current which causes setting up of lines of force in the electromagnet. I consider this differential arrangement of quite a marked advantage, since it eliminates troubles due to the corrosion of the contacts 76 and 77. It is true that this arrangement consumes more current than would be required by a single current which is made and broken. However, since the current is supplied from the storage battery of the car, which is being recharged, while the car is running, I do not consider this objection of any material moment.

I will now describe the means by which motion of the balance is communicated to a pair of hands. This motion is not communicated direct, since I have utilized the motion of the armature 78 to drive the hands of the clock. This is accomplished by the expedient of connecting the armature 78 by means of a link 86 to a lever arm 87, rotatably mounted on a shaft 88, which is rotatably mounted in the framework. A spring 89 serves to hold the arm 87 in its normal position. Rigid with the arm 87 is a lever arm 90, having mounted on it a feeding pawl 91, held in contact with a wheel 92 by a spring 93. A spring retracting pawl 94 serves to keep the wheel 92 from following the back stroke of the pawl 91. From the above it is obvious that reciprocation of the armature will result in a step by step rotation of the wheel 92 in the direction of the arrow.

The shaft 88 has a worm 95 mounted on it which engages a worm wheel 96 and by means of a second worm 97 mounted on a shaft 19 turns the worm 98 frictionally mounted on a shaft 99, upon which is mounted the clock hand 24. A set of gearing 100 is provided to give the proper motion to the hour hand 25.

In order to provide for the setting of the hands, I have mounted the worm wheel 98 frictionally on the shaft 99. Rigidly mounted on this shaft is a collar 101, provided with a compression spring 102, which serves to hold the wheel 98 against a collar 103, rigidly mounted on the shaft 99. A nut 104 is provided by means of which the hands may be set independently of the motion of the wheel 92.

The above mechanism serves to feed the wheel 92 step by step at each oscillation of the balance wheel and the gearing between the wheel 92 and the hand 24 is such that the hand keeps correct time. As before noted, the period of vibration of the balance wheel may be regulated by the regulating wheel 72.

It will be observed that the above described clock mechanism is unique in that the power moving the hands is wholly independent of the motion of the balance wheel, except as to period; that is, the balance wheel does not have to do any work, except the slight work of shifting the contact points 76 and 77. Consequently any reasonable load may be put on the shaft 99 without interfering with the time keeping qualities of the balance wheel 67. The shaft 99 may be used, as before noted, to turn a paper feed for the object of showing a record of instruments of any kind.

I will now describe the means by which the rod 47, the reciprocity of which, as before noted, controls the action of the speedometer portion of the apparatus.

The rod 47, as before noted, is arranged to reciprocate in the framework and is held by the spring 48 in the position shown in Figures 1 and 10. It is provided with a flexible portion 105 which projects through a hole in the armature 78 and is held in normal position by a spring 106 which is attached to a lever 107, mounted on an arm 108 rotatably mounted on the shaft 88. The arm 108 is provided with a single tooth 109 rigidly attached thereto, which is actuated by the feeding pawl 91 and to this end I have provided for the fourth tooth of wheel 92 a deeper notch. When the pawl 91 encounters the deep notch of the wheel 92, it sinks in the deep notch to engage the tooth 109 rigid to arm 108. Consequently, at every fourth stroke of the armature the arm 108 is rocked on its axis and thus permits a spring 110 mounted on the frame work and bearing against the rod 105 to displace said rod in a position to be engaged by a tripping piece 111, mounted on the under side of the armature 78. Consequently, at every fourth stroke of the armature 78, the rod 47 will be reciprocated and after such reciprocation will remain in its normal position for the next three strokes of said armature.

I will now describe how this periodic reciprocation of the rod 47 actuates the speed indicating apparatus shown in Figures 7, 8, 9, and 10. Starting with the parts in their normal position as shown in Figures 1 and 10, assume that the automobile has started. The wheel 36 commences its rotation, carrying with it the spider 39, which in turn, by means of the pin 41 contacting with the pin 58 carries with it the disk 53, which by means of the pin 59 contacting with the ear 60 advances the speed indicating hand 23. This action continues during three strokes of the armature 78, assuming that the apparatus started from the zero position of the wheel 92. On the fourth stroke of the armature 78, the rod 47 is suddenly lifted. At this instant, the hand 23 has been displaced for a distance proportional to the speed of the car during the time required for the three previous strokes of the armature 78. When the rod 47 is lifted, the spider 39 is unclutched from the wheel 36 by the removal of the friction exerted by arm 34 and at once returns to its normal position under the influence of the spring 40. However, the disk 53 is held in its displaced position, since it is prevented from returning by the friction of the spring 56. Consequently, the disk 61, to which is attached the hand 23, remains in its displaced position and the displacement of said hand is proportional to the speed of the wheel 36, which indicates the speed of the car during the three strokes of the armature 78. On the fifth stroke of the armature 78, the rod 47 is suddenly returned to its normal position. This results in re-engagement of the spider 39 with the wheel 36 and in the releasing of the disk 53, which returns under the influence of spring 54 until the pin 58 makes contact with the pin 41. The hand 23, therefore, is held in its displaced position by reason of the friction exerted by the spring 65 which has been returned to its normal position. Assume that during the second period that the speed of the car is increased. The spider 39 will be carried in advance of its former position, thereby advancing the hand 23 and this advancement of the hand 23 will continue until the speed of the car has become stationary, when no further advancement of the hand 23 will take place.

Now assume that the speed of the car has been decreased during one of the time periods measured by the three strokes of the armature 78. When the rod 47 is lifted, thereby removing the friction of the spring 65 from the disk 61, the hand 23 will at once be returned by the spring 63 to a position determined by the position of the disk 53, which has been carried forward by the spider 39 and then held in its displaced position by the friction of spring 56. Consequently, the hand 23 will take up a position indicative of the decreased speed of the car.

In general, the plan of my speedometer may be described as measuring the displacement of a reciprocating part over a definite period of time and transmitting this displacement to an indicating hand.

There remains to describe but one other feature of my invention, which is a means which I have provided of insuring the start of the balance wheel 67 from rest. This is accomplished by providing the balance wheel 67 with a starting pin 112, which is adapted to be actuated by a spring 113, mounted on an arm 114, mounted on a shaft 115, rotatably mounted in the frame work. The shaft 115 has on it a lever arm 116, connected by a lever 117 to an arm 118 extending through the armature 78. When the apparatus is at rest, the parts are in position, as shown in Figure 1. As soon as the battery is started, as before described, the retractile spring 80 will be pulled up by the electromagnet 82. This will rotate the shaft 115 in a clockwise direction (Figure 1) and the spring 113 will give a blow to the starting pin 112, thereby starting the balance wheel 67 in vibration. Under normal operation when the balance wheel is running, the spring 113 will not encounter the pin 112, since this pin is out of the way when the arm 114 is operated. The spring 113 comes into operation only when the clock is started and is provided to give the balance wheel a large initial vibration, thereby insuring an efficient contact of the points 76 and 77.

Many departures and variations may be made from the precise mechanism herein described without departing from the spirit of my invention.

I claim as my invention:—

1. In an electric clock the combination of a vibrating member, elastic means controlling the time of vibration of said member, and electrical means controlled through said member and operable to perioically wind said elastic means in synchronism with vibrations of said vibrating member, and maintain said member in vibration.

2. In an electric clock, the combination with a vibrating member, elastic means determining the time of vibration of said member, means for periodically displacing said elastic means to thereby communicate impulses to said vibrating member, clock hands and a gear train connected therewith, and means controlled by the vibrating member for supplying power to drive the clock train independently of the amount of power applied to the vibrating member.

3. In an electric clock, the combination with a vibrating member, elastic means determining the time of vibration of said member, means for periodically displacing said elastic means to thereby communicate impulses to said vibrating member, clock hands and a gear train connected therewith, and electrical means controlled by the vibrating member for actuating the clock train.

4. In an electric clock, the combination of a vibrating member, elastic means determining the time of vibration of said member, electrical means to periodically wind said elastic member in synchronism with vibrations of said vibrating member, whereby the same is kept in vibration, clock hands and a gear train connected therewith, and electrically operated means controlled by the vibrating member for actuating the clock train.

5. In an electric clock, the combination of a vibrating member, elastic means determining the time of vibration of said member, and electric means to periodically wind said elastic means, said electric means including an electric circuit, a battery in said circuit, a differentially wound magnet having two windings opposing each other, the windings of the magnet being connected in parallel to the storage battery, an armature, and a switch operatively connected with the armature and arranged in said circuit so that when the switch is closed current flows through both of the windings of the magnet without energizing the same, and when the switch is opened current flows through only one of the magnet windings and the magnet is energized, whereby sparking at the switch contact points is prevented.

6. In an electric clock, the combination of a balance wheel, a hair spring determining the vibration of the balance wheel, electrical means to periodically wind said hair spring in synchronism with vibrations of the balance wheel, said electrical means including an electric circuit, a battery in the circuit, an electromagnet in the circuit, an armature, an intermittently operated switch in the circuit, and starting means for the balance wheel, including a pin on the balance wheel, and a lever operatively connected with the armature and adapted to be moved thereby to engage the pin upon starting the battery.

7. In an electric clock, the combination of a balance wheel, a hair spring determining the vibration of the balance wheel, electrical means to periodically wind said hair spring in synchronism with vibrations of the balance wheel, said electrical means including an electric circuit, a battery in the circuit, an electromagnet in the circuit, an armature, an intermittently operated switch in the circuit operatively connected with said armature, and starting means for the balance wheel, including a pin on the balance wheel, and a lever operatively connected with the armature and adapted to be moved thereby to engage the pin upon starting the battery.

8. In an electric clock, an oscillating balance element, a hair spring connected at one end to said element, a member for holding and displacing the free end of the hair spring to vary its tension, and means controlled by changes in tension of said spring for operating said member at instants so related to the positions of the balance element during its oscillations as to maintain said element in oscillation.

9. In an electric clock, an oscillating balance element, a hair spring connected at one end to said element, an anchorage member for the free end of the hair spring, adjustable to vary the tension of the spring, and electromagnetic means controlled by the tension of said spring caused by oscillations of said element for adjusting said anchorage member to vary the tension of said hair spring at instants so related to the positions of the balance element during its oscillations as to maintain said element in oscillation.

10. In an electric clock, an oscillating balance element, a hair spring connected to said element and controlling its oscillations, electromagnetically controlled means for varying the tension of said spring, a controlling circuit for said last mentioned means, and contact means operable in synchronism with said element for changing the condition of said circuit and thereby causing operations of said controlled means to vary the tension of said spring in a manner to maintain said element in operation.

11. In an electric clock, an oscillating balance element, a hair spring connected to said element and controlling its oscillations, electromagnetically controlled means for varying the tension of said spring, a controlling circuit for said last mentioned means, contact means operable in synchronism with said element for changing the condition of said circuit and thereby causing operations of said controlled means to vary the tension of said spring in a manner to maintain said element in operation, and time indicating devices operable in increments by said controlled means.

12. In an electric clock, an oscillating balance element, an elastic device connected to said element to control its period of oscillation, a device for varying the condition of said elastic device in a manner to maintain said element in oscillation, electromagnetic means controlled by variations in the tension in said elastic device occurring during oscillations of said element for actuating said varying device, and time indicating means operable by said means.

13. In an electric clock, an oscillating balance element, an elastic device connected to said element to cause it to oscillate at a regular rate, means including an electric circuit controlled by said element during its oscillations, for varying the action of said device on said element in a manner to maintain said element in oscillation, and time indicating means controlled by said first mentioned means.

14. In an electric clock, an oscillating balance element, a hair spring connected at one end to said element, an arm oscillatable about the axis of said element, a contact element carried by said arm, a contact device also carried by said arm movable in the direction of oscillation of said arm into and out of contact with said contact element and yieldingly and resiliently biased out of contact with said contact element, the other end of said spring being connected to said device, whereby the movement of said arm will vary the tension of said spring and tend to pull said contact device into or out of engagement with said contact element, an electric circuit controlled by said contact element and device, and electromagnetic means included in said circuit and operable upon said arm to oscillate it and through it vary the tension of said spring and thus maintain said balance element in oscillation.

15. In an electric clock, an oscillating balance element, a hair spring connected at one end to said element, an arm oscillatable about the axis of said element, a contact element carried by said arm, a contact device also carried by said arm movable in the direction of oscillation of said arm into and out of contact with said contact element and yieldingly and resiliently biased out of contact with said contact element, the other end of said spring being connected to said device, whereby the movement of said arm will vary the tension of said spring and tend to pull said contact device into or out of engagement with said contact element, an electric circuit controlled by said contact element and device, electromagnetic means included in said circuit and operable upon said arm to oscillate it and through it vary the tension of said spring and thus maintain said balance element in oscillation, and time indicating devices operable in increments by said electromagnet.

16. In an electric clock, an oscillating balance element, a hair spring connected at one end to said element, an arm oscillatable about the axis of said element, a contact element carried by said arm, a contact device also carried by said arm movable in the direction of oscillation of said arm into and out of contact with said contact element and yieldingly and resiliently biased out of contact with said contact element, the other end of said spring being connected to said device, whereby the movement of said arm will vary the tension of said spring and tend to pull said contact device into or out of engagement with said contact element, electric means including a circuit controlled by said contact element and contact device for oscillating the arm to vary the tension of said spring and maintain said balance element in oscillation, and time indicating devices operable by said electric means.

17. In an electric clock, an oscillating balance element, a hair spring connected at one end to said element, contact mechanism connected to the free end of said spring and opened and closed by the changes in tension in said spring, and means controlled by said contact mechanism for varying the tension of said spring in a manner to maintain said balance element in oscillation.

18. In an electric clock, an oscillating balance element, a hair spring connected to said element, a circuit controlling device connected to said spring for varying its tension to maintain said balance element in oscillation, and in turn also operated between open and closed position by changes in tension in said spring, and electromagnetic means controlled by said device for operating it in synchronized relation to the oscillations of said element to vary the tension of said spring.

19. In an electric clock, an oscillating balance element, a hair spring connected to said element to impart regularity to its oscillations, a member connected to said spring and operable to vary the tension of said spring and maintain said balance element in oscillation, and means controlled jointly by said spring and member during the oscillation of said element for causing oscillations of said member at intervals related to the oscillations of said element.

20. In an electric clock, an oscillating balance element, a spring connected at one end to said element, a circuit controller connected to the free end of said spring, a time indicating device, and electrically controlled means operated by said controller for driving said time device and varying the tension of said spring to maintain said balance element in oscillation.

21. In an electric clock, an oscillating balance element, a hair spring connected at one end to said element, a circuit device connected to the free end of said spring, and means controlled by said circuit device for maintaining said balance element in oscillation.

22. In an electric clock, an oscillating balance element, and means maintaining said element in oscillation and including contact members engaged and disengaged at intervals by the oscillation of said element, an electromagnet having equal but magnetically opposing coils, one of said coils being continuously energized, an armature for said electromagnet and biased to retracted position, means connected to said armature for imparting impulses to said element for starting said element from stationary position, and a circuit including the other of said coils and said contact members so as to be closed and opened by said contact members, whereby arcing at the contact members as the electromagnet is made effective and ineffective will be prevented.

23. In an electric clock, an oscillating balance element, a hair spring connected to said element to impart regularity to its oscillations, a member connected to said spring and operable to vary the tension of said spring and maintain said balance element in oscillation, and electromagnetic means having a circuit controlled jointly by said spring and member during the oscillation of said element for causing oscillations of said members at intervals related to the oscillations of said element.

24. In an electric clock or the like, an oscillating control element, a spring connected to said element for securing regular oscillations thereof, electromagnetic means for varying the influence of the spring upon said element, a source of electrical energy, and circuit means including said electromagnetic means and said source of energy and rendered effective automatically through the oscillations of said element for causing operation of the electromagnetic means in a manner to vary the influence of said spring upon said element and thereby maintain said element in oscillation.

25. In an electric clock or the like, an oscillating control element, a spring connected to said element for securing regular oscillations thereof, electromagnetic means operable upon said spring to vary the force of the latter upon said element, a source of electrical energy, and circuit means including said electromagnetic means and said source of energy and rendered effective automatically through the oscillations of said element for causing operation of said electromagnetic means in a manner to vary the action of said spring upon said element and thereby maintain said element in oscillation.

26. In an electric clock or the like, an oscillating balance wheel, a hair spring connected at one end to said balance wheel, electromagnetic means having an armature movable between two positions and connected to the free end of said spring to tension the same varying amounts upon the oscillation of said armature, and means including electric circuits and said electromagnetic means for rocking said armature in synchronism with said wheel to vary the tension of said spring at each oscillation of the wheel and thereby maintain said element in oscillation.

27. In an electric clock or the like, a balance wheel, a hair spring connected to said wheel for securing regular oscillations of said wheel, a controlling member operative upon said spring for varying its influence upon said wheel, and electromagnetic means controlled by the oscillations of said wheel for operating said member in alternate directions to vary the influence of said spring upon said wheel and thereby maintain said wheel in oscillation.

28. In an electric clock or the like, an oscillating balance element, a hair spring connected at one end to said balance element, electromagnetic means having an armature movable between two positions and connected to the free end of said spring to tension the same varying amounts upon the oscillation of said armature, and means controlled from said balance wheel and including electric circuits and said electromagnetic means for rocking said armature in synchronism with said element to vary the tension of said spring at each oscillation of the element and thereby maintain said element in oscillation.

In testimony to the foregoing I hereto sign my name.

ARTHUR F. POOLE.